United States Patent
Bartholomew et al.

(10) Patent No.: US 9,638,268 B2
(45) Date of Patent: May 2, 2017

(54) MAGNETIC CLUTCH WITH FOREIGN MATERIAL EXTRACTION AND COOLING

(71) Applicant: DENSO International America, Inc., Southfield, MI (US)

(72) Inventors: Christopher Bartholomew, Novi, MI (US); Tomoyuki Mizuguchi, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/683,784

(22) Filed: Apr. 10, 2015

(65) Prior Publication Data

US 2016/0298700 A1     Oct. 13, 2016

(51) Int. Cl.
| | |
|---|---|
| *F16D 27/112* | (2006.01) |
| *F16D 27/14* | (2006.01) |
| *F16H 1/00* | (2006.01) |
| F16D 27/00 | (2006.01) |

(52) U.S. Cl.
CPC ............ *F16D 27/14* (2013.01); *F16D 27/112* (2013.01); *F16H 1/00* (2013.01); *F16D 2027/008* (2013.01)

(58) Field of Classification Search
CPC ................................ F16D 27/00–27/14; F16D 2300/21–2300/0212
See application file for complete search history.

(56) References Cited

U.S. PATENT DOCUMENTS

| | | | | |
|---|---|---|---|---|
| 880,266 | A | * | 2/1908 | Ast ........................... 188/264 A |
| 6,012,563 | A | * | 1/2000 | Aoki ...................... F16D 27/06 |
| | | | | 192/84.95 |
| 6,634,476 | B2 | * | 10/2003 | Inoue .................... F16D 27/112 |
| | | | | 192/113.23 |
| 7,108,623 | B2 | | 9/2006 | Cadarette et al. |
| 8,272,981 | B2 | | 9/2012 | Galletti et al. |
| 8,469,170 | B2 | | 6/2013 | Katano et al. |

\* cited by examiner

*Primary Examiner* — Richard Lorence
(74) *Attorney, Agent, or Firm* — Harness, Dickey & Pierce, P.L.C.

(57) ABSTRACT

The present teachings provide for a clutch including a hub, a rotor, and an electromagnet. The hub can be rotatable about a central axis. The rotor can be rotatable about the central axis and can be rotatable relative to the hub. The rotor can define an annular cavity that can be disposed about the central axis. A surface of the annular cavity can define at least one groove that can extend helically about the central axis. The electromagnet can be received in the annular cavity. When the electromagnet is energized, the hub can engage the rotor to transmit torque between the hub and rotor.

10 Claims, 3 Drawing Sheets

MAGNETIC CLUTCH WITH FOREIGN MATERIAL EXTRACTION AND COOLING

FIELD

The present disclosure relates to a magnetic clutch with foreign material extraction and cooling.

BACKGROUND

This section provides background information related to the present disclosure which is not necessarily prior art.

Magnetic clutches are used for selectively transmitting torque between two rotating parts. For example, magnetic clutches are used in vehicles to selectively operate accessories, such as air conditioning compressors, or pumps. Such magnetic clutches typically include a stator, a rotor, and a hub. The stator includes an electromagnet and is typically received within an annular cavity defined by the rotor. The rotor is configured to rotate relative to the stator about a central axis. The hub is configured to rotate about the central axis. When the electromagnet is energized, it generates a magnetic field that pulls the hub into contact with the rotor. Typically the hub is drivingly coupled to the device (e.g. compressor or pump), while the rotor receives rotational input from the vehicle's engine (e.g. via an accessory belt). Frictional contact between the hub and rotor cause torque to be transferred between the hub and rotor to drive the device.

During operation, debris (e.g. dirt, sand, grit, salt, rust) and/or fluids (e.g. water, grease, refrigerant) can get into the annular cavity and between the stator and the rotor. As the rotor rotates about the stator, the debris and/or fluids can scratch or strip the surface of the rotor and stator, exposing the bare metal (e.g. steel) beneath any coated outer surfaces. The exposed, bare metal can then corrode or oxidize (e.g. rust). Buildup of debris and oxidation material can cause friction between the stator and rotor, which can result in heat buildup and reduced efficiency and lifespan of the device and the clutch.

SUMMARY

This section provides a general summary of the disclosure, and is not a comprehensive disclosure of its full scope or all of its features.

The present teachings provide for a clutch including a hub, a rotor, and an electromagnet. The hub can be rotatable about a central axis. The rotor can be rotatable about the central axis and can be rotatable relative to the hub. The rotor can define an annular cavity that can be disposed about the central axis. A surface of the annular cavity can define at least one groove that can extend helically about the central axis. The electromagnet can be received in the annular cavity. When the electromagnet is energized, the hub can engage the rotor to transmit torque between the hub and rotor.

The present teaching further provide for a clutch including a hub, a rotor and an electromagnet. The hub can be rotatable about a central axis. The rotor can be rotatable about the central axis and can be rotatable relative to the hub. The rotor can define an annular cavity that can be disposed about the central axis. A front wall of the rotor can define a plurality of slots circumferentially spaced about the central axis and a plurality of first ramps circumferentially spaced about the central axis. Each slot can fluidly couple the annular cavity with an exterior side of the front wall. Each first ramp can narrow to a first edge. The first edge of each first ramp can define a trailing edge of a corresponding one of the slots. The electromagnet can be received in the annular cavity. When the electromagnet is energized, the hub can engage the rotor to transmit torque between the hub and rotor.

The present teachings further provide for a clutch including a hub, a rotor, and an electromagnet. The hub can be rotatable about a central axis. The rotor can be rotatable about the central axis and can be rotatable relative to the hub. The rotor can include an inner wall, an outer wall, and a front wall. The inner, outer, and front walls can define an annular cavity that can be disposed about the central axis. The surface of the annular cavity can define at least one groove that can extend helically about the central axis. The front wall can define a plurality of slots that can be circumferentially spaced about the central axis. The front wall can define a plurality of first ramps that can be circumferentially spaced about the central axis. Each slot can fluidly couple the annular cavity with an exterior side of the front wall. Each first ramp can narrow to a leading edge. The leading edge of each first ramp can define a trailing edge of a corresponding one of the slots. The electromagnet can be received in the annular cavity. When the electromagnet is energized, the hub can engage the rotor to transmit torque between the hub and rotor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings are directed to a magnetic clutch for use with a clutched device, such as a vehicle air conditioning compressor or water pump for example. The magnetic clutch of the present teachings includes a rotor that improves efficiency and longevity of the magnetic clutch and the clutched device by preventing buildup of fluid and debris between the stator and rotor and improving airflow between the stator and the rotor.

Figure 1:
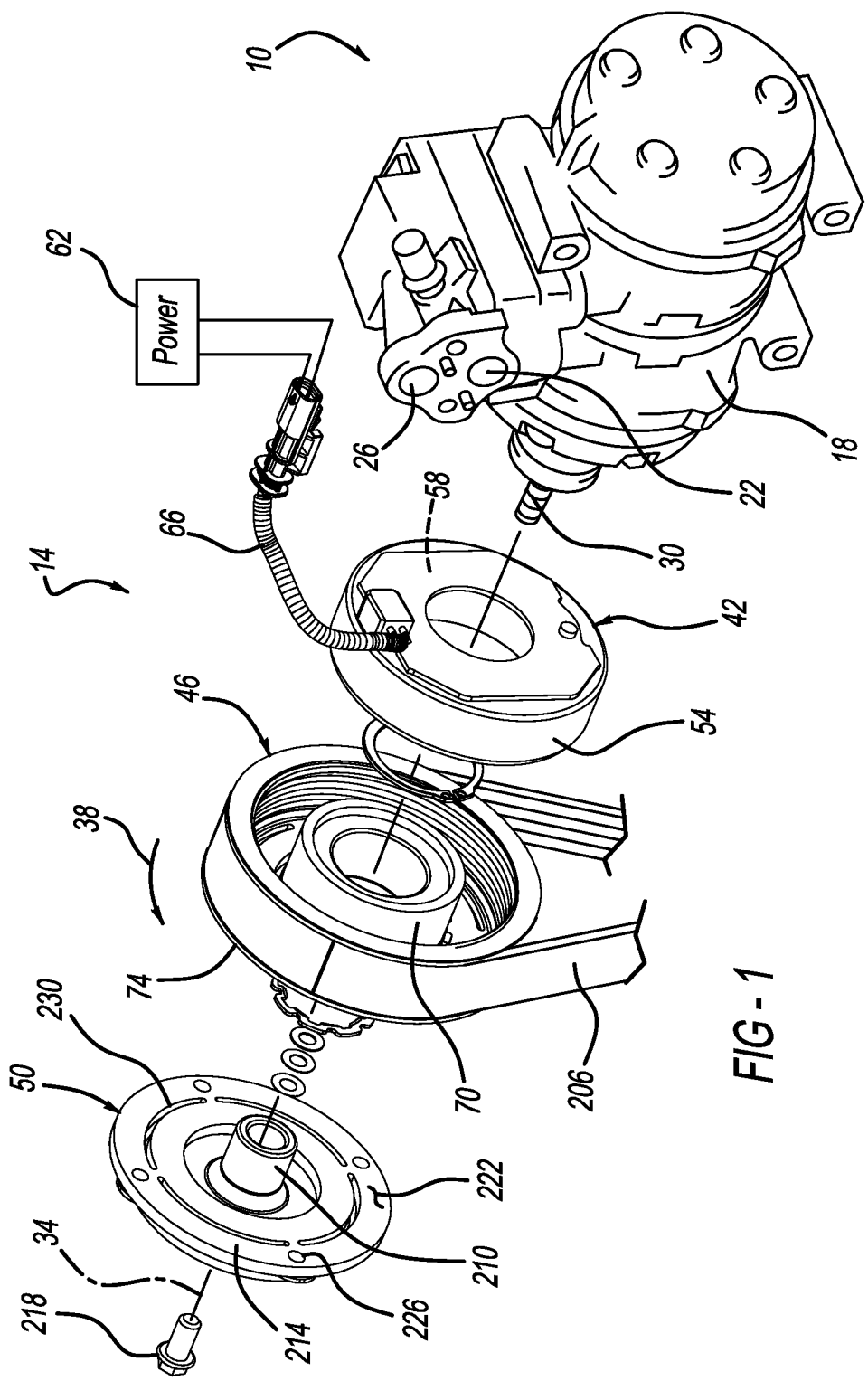
FIG. 1 is an exploded view of a device including a magnetic clutch in accordance with the present teachings.
Figure 2:
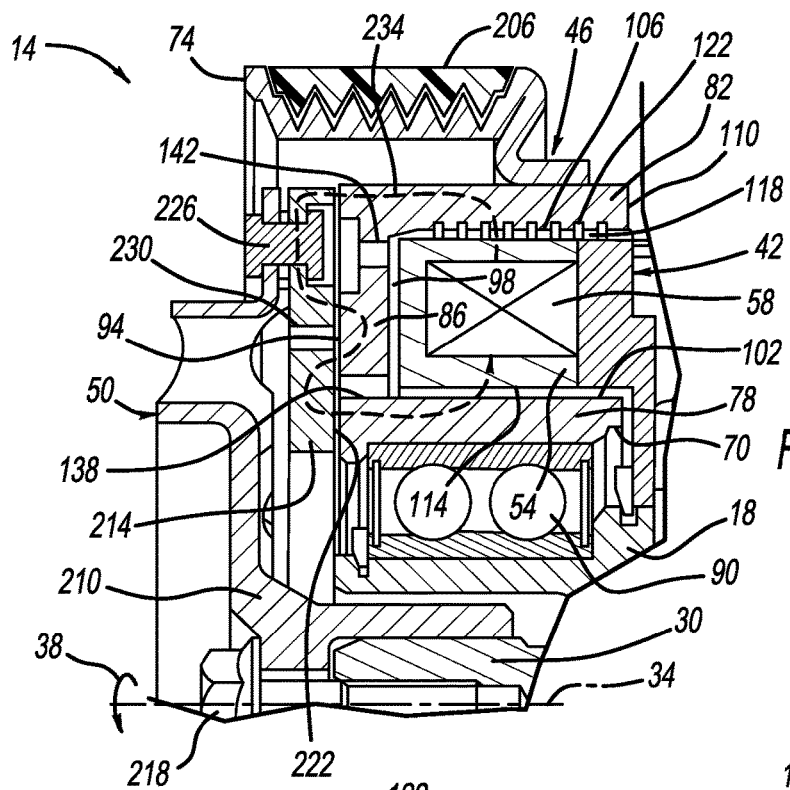
FIG. 2 is a sectional view of a portion of the magnetic clutch of FIG. 1.

With reference to FIGS. 1 and 2, a clutched device 10 and a magnetic clutch 14 is illustrated. In the example provided, the clutched device 10 is a compressor of a vehicle air conditioning system, though it is appreciated that the magnetic clutch of the present teachings can be used with other devices, such as pumps for example. The clutched device 10 (hereafter referred to as the "compressor") can be fixedly mounted to an engine (not shown) in a conventional manner. The compressor 10 can be constructed in a conventional manner and can generally include a compressor housing 18, an inlet 22, an outlet 26, a drive member 30 and a compressor mechanism (not specifically shown) within the compressor housing 18. The inlet 22 can be configured to receive a fluid (e.g. a refrigerant) into the compressor housing 18 and supply the fluid to the compressor mechanism (not shown). The outlet 26 can be configured to permit expulsion of the fluid from the compressor housing 18 to flow to other components (not shown) of the air conditioning system, such as a condenser, an expansion valve, and an evaporator for example. The drive member 30 can be supported within the compressor housing 18 for rotation about a central axis 34. One end of the drive member 30 can extend axially outward from the compressor housing 18 and the other end of the drive member 30 can be drivingly coupled to the compressor mechanism (not shown) within the compressor housing 18. The compressor mechanism (not shown) can be any suitable mechanism for compressing the fluid received from the inlet 22 and expelling the compressed fluid through the outlet 26. Rotation of the drive member 30 can operate the compressor mechanism (not shown) to compress the fluid in any suitable manner. In the example provided, the compressor mechanism (not shown) is configured to compress the fluid when the drive member 30 rotates in a rotational direction 38, though other configurations can be used.

The magnetic clutch 14 can include a stator 42, a rotor 46, and a hub 50. The stator 42 can include a stator housing 54 and an electromagnet 58 (e.g. a coil of electrically conductive wires) that can be non-rotatably disposed within the stator housing 54. The stator housing 54 and electromagnet 58 can have a generally annular shape disposed about the central axis 34. The stator housing 54 can be a ferrimagnetic or ferromagnetic material, such as steel for example and can be non-rotatably mounted to the compressor housing 18. The electromagnet 58 can be electrically coupled to a power source 62 by a power cable 66. The electromagnet 58 can be energized or activated by supplying the electromagnet 58 with electrical power. When energized, the electromagnet 58 produces a magnetic field (not specifically shown).

The rotor 46 can include a rotor body 70 and a pulley 74. The rotor body 70 can be a generally annular shape having an inner wall 78, an outer wall 82, and a front wall 86. The rotor body 70 can be a ferrimagnetic or ferromagnetic material, such as steel for example. The inner wall 78 can be supported for rotation about the central axis 34 by a bearing 90 that can be disposed radially between the inner wall 78 and a portion of the compressor housing 18. The inner and outer walls 78, 82 can be radially spaced apart and coupled by the front wall 86, which can extend radially between the inner and outer walls 78, 82. The front wall 86 can have a front surface 94. The inner, outer, and front walls 78, 82, 86 can define an annular cavity 98 that is disposed about the central axis 34. In other words, an outermost surface 102 of the inner wall 78 can have a diameter that is less than an innermost surface 106 of the outer wall 82. The innermost surface 106 and outermost surface 102 can be coated for corrosion protection by any suitable means. The annular cavity 98 can be open at a rear side 110 of the rotor 46 that is opposite the front surface 94. The stator 42 can be received in the annular cavity 98 through the rear side 110 of the rotor 46. An exterior surface 114 of the stator can be spaced apart from the inner, outer, and front walls 78, 82, 86 by a gap 118 such that the rotor 46 can be configured to rotate relative to the stator 42. The exterior surface 114 can be coated for corrosion protection by any suitable means.

Figures 3, 4:
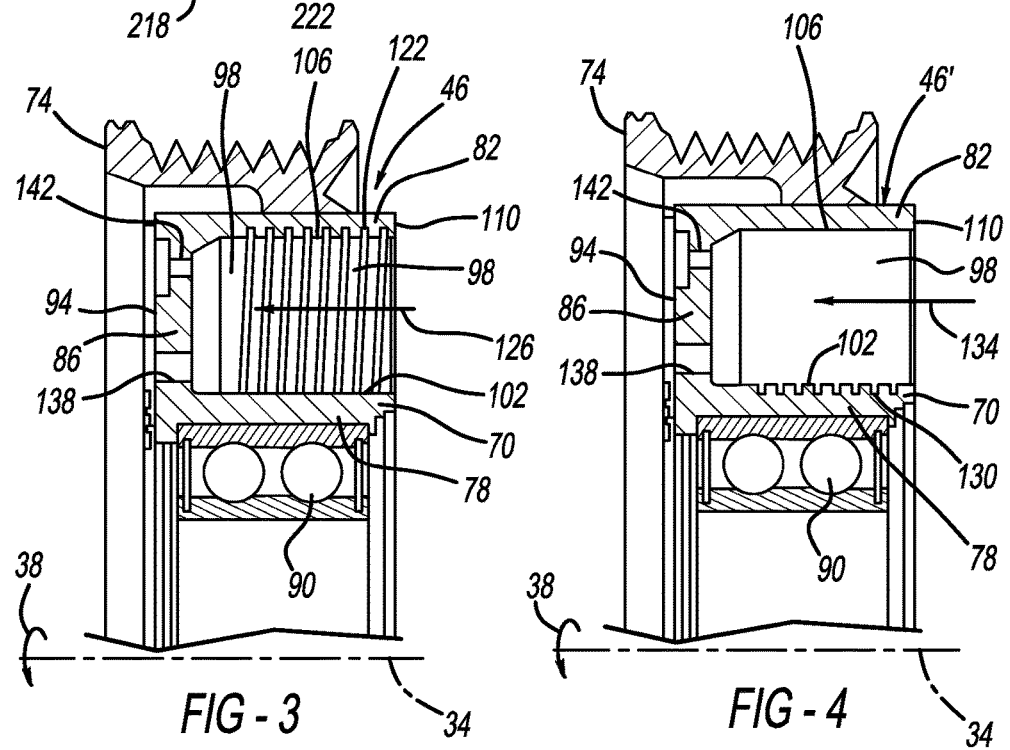
FIG. 3 is a sectional view of a portion of the magnetic clutch of FIG. 1, illustrating a rotor of a first construction.
FIG. 4 is a sectional view similar to FIG. 3, illustrating a rotor of a second construction.

With additional reference to FIG. 3, a portion of the rotor 46 is illustrated. The innermost surface 106 of the outer wall 82 can define a groove or a plurality of grooves 122 that extend in a helical manner about the central axis 34. The grooves 122 can extend substantially the entire axial length of the innermost surface 106. The grooves 122 can be a right-handed helix (i.e. spiraling clockwise from the rear side 110 of the rotor 46 toward the front wall 86), or a left-handed helix (i.e. spiraling counter-clockwise from the rear side 110 to the front wall 86). In the example provided, the grooves 122 are right-handed helixes, such that as the rotor 46 rotates about the central axis 34 in the rotational direction 38, an object or debris (not shown) that is within the cavity 98 and following the grooves 122 would move axially toward the front wall 86 (i.e. in an axial direction 126). Thus, debris (e.g. sand, dirt, grit, salt, rust) or fluids that become disposed in the portion of the gap 118 (FIG. 2) that is between the outer wall 82 and the stator 42 (FIG. 2) can be expelled therefrom. When the rotor 46 rotates in the rotational direction 38, the grooves 122 can urge the debris or fluids (not shown) toward the front wall 86, where it can be expelled from the cavity 98 as discussed below. In an alternative construction that is not specifically shown, the grooves 122 are left-handed grooves 122 and rotation in the rotational direction 38 would cause such debris or fluids (not shown) to move axially toward the rear side 110 (i.e. opposite the axial direction 126). Thus, rotation of the rotor 46 and the grooves 122 in the rotational direction 38 can inhibit debris or fluids from entering the gap 118 from the rear side 110 of the rotor 46, and can act to expel debris or fluids that otherwise came to be in the gap 118.

With additional reference to FIG. 4, a portion of a rotor 46' of a second construction is illustrated. The rotor 46' can be similar to rotor 46, except as illustrated and described herein. The rotor 46' can be configured such that the innermost surface 106 of the outer wall 82 does not define the grooves 122 (FIGS. 2 and 3). In this construction, the outermost surface 102 of the inner wall 78 can define a groove or plurality of grooves 130 that extend in a helical manner about the central axis 34. The grooves 130 can extend substantially the entire axial length of the outermost surface 102. The grooves 130 can be a right-handed helix (i.e. spiraling clockwise from the rear side 110 of the rotor 46' toward the front wall 86), or a left-handed helix (i.e. spiraling counter-clockwise from the rear side 110 to the front wall 86). In the example provided, the grooves 130 are a right-handed helix, such that as the rotor 46 rotates about the central axis 34 in the rotational direction 38, debris or fluids (not shown) that are within the cavity 98 and following the grooves 130 would move axially toward the front wall 86 (i.e. in an axial direction 134). Thus, debris (e.g. sand, dirt, grit, salt, rust) or fluids that become disposed in the portion of the gap 118 (FIG. 2) that is between the inner wall 78 and the stator 42 (FIG. 2) can be expelled therefrom. When the rotor 46' rotates in the rotational direction 38, the grooves 130 can urge the debris or fluids (not shown) toward the front wall 86, where it can be expelled from the cavity 98 as discussed below with reference to rotor 46'. In an alternative construction that is not specifically shown, the grooves 130 are left-handed grooves 130 and rotation in the rotational direction 38 can cause such debris or fluids (not shown) to move axially toward the rear side 110 (i.e. opposite the axial direction 134). Thus, rotation of the rotor 46' and the grooves 130 in the rotational direction 38 can inhibit debris or fluids from entering the gap 118 from the rear side 110 of the rotor 46', and can act to expel debris or fluids that otherwise came to be in the gap 118.

In yet another alternative construction, not specifically shown, the rotor 46 or 46' can include the grooves 122 in the innermost surface 106 of the outer wall 82 and the grooves 130 in the outermost surface 102 of the inner wall 78. In such a construction, the grooves 122 and 130 can have the same "handedness" (i.e. right- or left-handed helixes), or can have different handedness.

Figure 5:
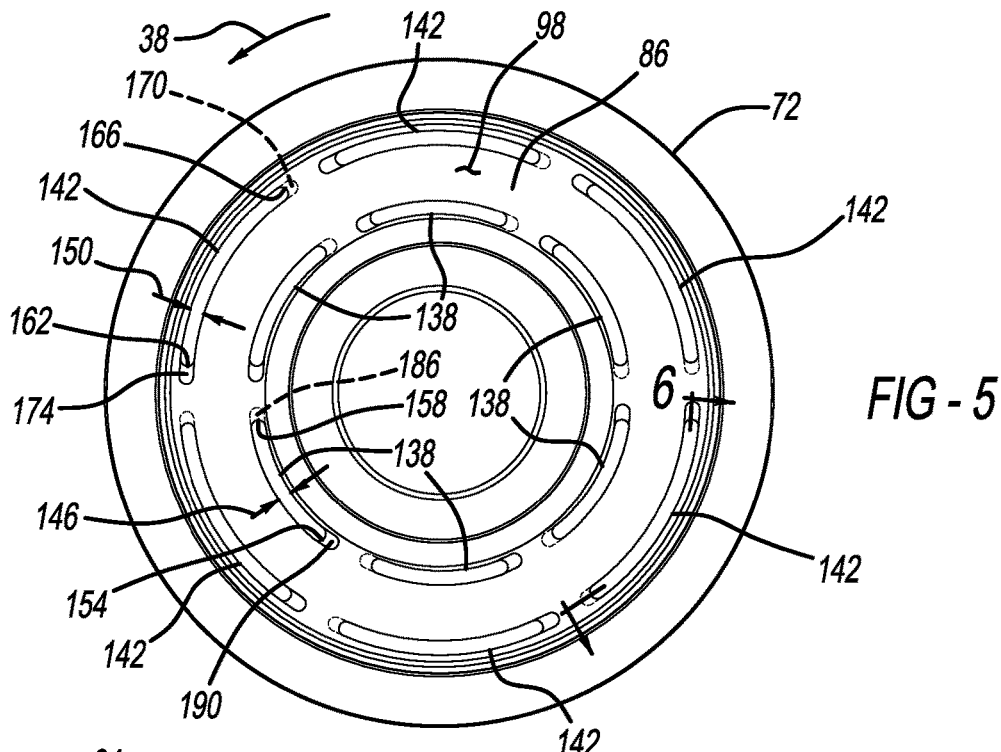
FIG. 5 is a plan view of the rotor of FIG. 2, illustrating a plurality of slots.

With additional reference to FIG. 5, the front wall 86 can define a plurality of inner slots 138 and a plurality of outer slots 142. Each inner slot 138 can have an arcuate shape that is centered about the central axis 34 and can extend through the front wall 86 to fluidly couple the cavity 98 with an exterior of the rotor 46. In the example provided, the inner slots 138 have similar arc lengths to each other and are evenly circumferentially spaced apart about the central axis 34, though other configurations can be used. The arc length of each inner slot 138 can be greater than the radial width 146 of the inner slot 138. Each outer slot 142 can have an arcuate shape that is centered about the central axis 34 and can extend through the front wall 86 to fluidly couple the cavity 98 with the exterior of the rotor 46. In the example provided, the outer slots 142 have similar arc lengths to each other and are evenly circumferentially spaced apart about the central axis 34, though other configurations can be used. The arc length of each outer slot 142 can be greater than the radial width 150 of the outer slot 142. The arc length of each outer slot 142 can be greater than the arc length of each inner slot 138. The outer slots 142 can be disposed radially outward of the inner slots 138. The inner slots 138 can be circumferentially aligned with the outer slots 142. When the rotor 46 rotates in the rotational direction 38, each inner slot 138 can have a leading edge 154 and a trailing edge 158, and each outer slot 142 can have a leading edge 162 and a trailing edge 166.

Figure 6:
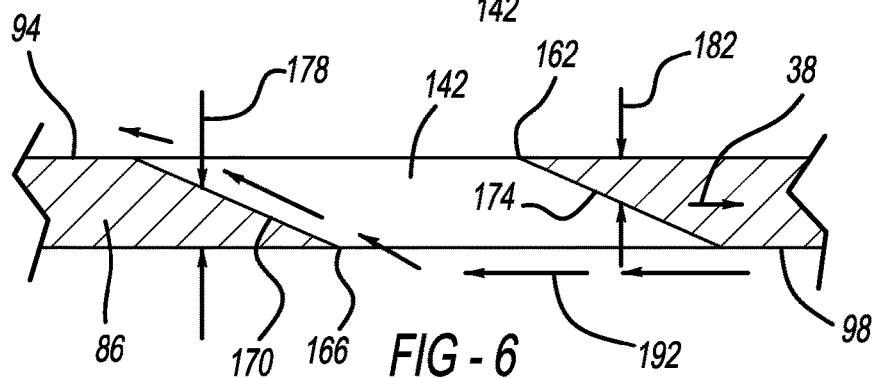
FIG. 6 is a sectional view of a portion of the rotor of FIG. 2, taken along arc 6-6 shown in FIG. 5, illustrating a slot of a first construction.

With additional reference to FIG. 6, a sectional view of one of the outer slots 142 is illustrated, taken along arc 6-6 as shown in FIG. 5. Each outer slot 142 can include a first ramp 170 and a second ramp 174. The width 178 of the first ramp 170 can be narrower proximate to the trailing edge 158 and can expand with increased distance from the leading edge 162. The first ramp 170 can expand until it has the same width as the front wall 86. The width 182 of the second ramp 174 can be narrower proximate to the leading edge 162 and can expand with increased distance from the trailing edge 158. In the example provided, the first ramp 170 and second ramp 174 are illustrated generally as inclined planes, though other configurations such as curved ramps can be used. The inner slots 138 can be similarly constructed such that each inner slot 138 can have a third ramp 186 (FIG. 5) similar to the first ramp 170 and a fourth ramp 190 (FIG. 5) similar to the second ramp 174. In operation, when the rotor 46 rotates in the first rotational direction 38, the ramps 170, 174, 186, 190 create an area of low pressure proximate to the front surface 94 which acts to draw air, fluids and debris out of the cavity 98 (FIGS. 2-4) as indicated by arrows 192. The shape of the ramps 170, 174, 186, 190 can also scoop and direct the air, fluids, and debris through the slots 138, 142 and out of the cavity 98.

Figure 7:
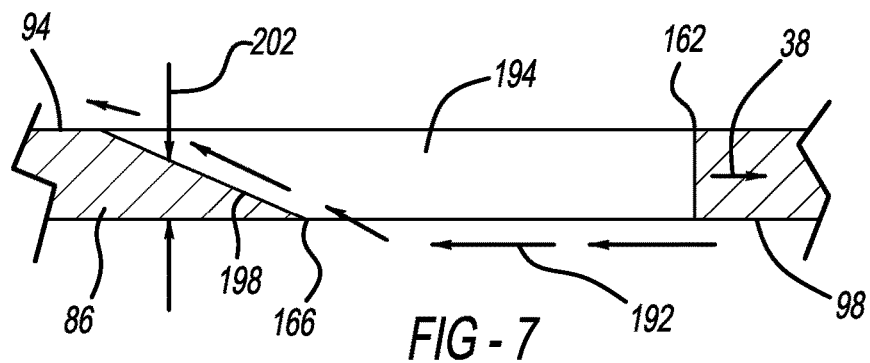
FIG. 7 is a sectional view similar to FIG. 6, illustrating a slot of a second construction.

With additional reference to FIG. 7, a sectional view similar to FIG. 6 illustrates a slot 194 of a second construction for use with the rotor 46. The slot 194 can replace the inner and/or outer slots 138, 142 (FIGS. 5 and 6) of rotor 46 (FIGS. 5 and 6). The slot 194 can include a fifth ramp 198. The width 202 of the fifth ramp 198 can be narrower proximate to the trailing edge 158 of the slot 194 and can expand with increased distance from the leading edge 162 of the slot 194. The leading edge 162 can be generally perpendicular to the front surface 94 of the rotor 46 and the slot 194 does not include a ramp proximate to the leading edge 162. The slots 194 can operate similarly to slots 138, 142 to draw, scoop, and generally direct air, fluids, and debris through the slots 194 and out of the cavity 98.

Returning to FIGS. 1 and 2, the pulley 74 can be fixedly coupled to the rotor body 70 for common rotation therewith about the central axis 34. In the example provided, the pulley 74 is fixedly coupled to the outer wall 82, though other configurations can be used. For example, the pulley 74 can be integrally formed with the rotor body 70. The pulley 74 can be configured to be engaged by a drive belt 206. The drive belt 206 can be an accessory belt (e.g. serpentine belt) of the engine (not shown) and can be configured to provide input torque to the pulley 74 to rotate the rotor 46 in the rotational direction 38.

The hub 50 can include a hub body 210 and a hub plate 214. The hub body 210 can be fixedly coupled to the drive member 30 for common rotation about the central axis 34. In the example provided, the hub body 210 is coupled to the drive member 30 by a screw 218 threadably received in the center of the drive member 30 along the central axis 34. The hub plate 214 can be disposed axially between the hub body 210 and the front wall 86 of the rotor 46 such that a rear surface 222 of the hub plate 214 can oppose the front surface 94 of the rotor 46. The hub plate 214 can be a ferrimagnetic or ferromagnetic material, such as steel for example. The hub plate 214 can be coupled to the hub body 210 for common rotation therewith about the central axis 34, while being axially slidable about the central axis 34. In the example provided, the hub plate 214 is coupled to the hub body 210 by a plurality of pins 226 and can slide axially on the pins 226 between a first position and a second position. In the first position, the rear surface 222 is space apart from the front surface 94. In the second position, the pins 226 are recessed into the rear surface 222 and the rear surface 222 contacts or engages the front surface 94. While not specifically shown, a biasing member can bias the hub plate 214 toward the first position.

The hub plate 214 can define a plurality of hub slots 230. Each hub slot 230 can have an arcuate shape that is centered about the central axis 34 and can extend through the hub plate 214. In the example provided, the hub slots 230 have similar arc lengths to each other and are evenly circumferentially spaced apart about the central axis 34, though other configurations can be used. The hub slots 230 can be disposed radially between the inner and outer slots 138, 142 of the rotor 46.

When the electromagnet 58 is activated, it generates a magnetic field that can attract the hub plate 214 axially toward the rotor body 70 to move the hub plate 214 from the first position to the second position. When in the second position, friction between the rear surface 222 of the hub plate 214 and the front surface 94 of the rotor body 70 can transmit torque between the rotor 46 and the hub 50. A net magnetic flux (illustrated by arrows 234) can flow through the stator housing 54, the rotor body 70, the hub plate 214, and back through the stator housing 54 in a serpentine path around the inner, outer, and hub slots 138, 142, 230 as shown. In the example provided, the net magnetic flux 234 can flow from the electromagnet 58 through the stator housing 54, to the outer wall 82. The outer slots 142 in the rotor 46 can inhibit the net magnetic flux 234 from flowing radially inward through the front wall 86, causing the net magnetic flux 234 to flow from the outer wall 82 to the hub plate 214. The net magnetic flux 234 can flow radially inward through the hub plate 214 until it is inhibited by the hub slots 230. The hub slots 230 can cause the net magnetic flux 234 to flow from the hub plate 214 to the portion of the front wall 86 that is between the inner and outer slots 138, 142. The inner slots 138 can inhibit the net magnetic flux 234 from flowing radially inward through the front wall 86 to the inner wall 78, causing the net magnetic flux 234 to flow from the inner wall 78 to the portion of the hub plate 214 that is radially inward of the hub slots 230. The net magnetic flux 234 can then flow from the hub plate 214, to the inner wall 78 and back through the stator housing 54 to the electromagnet 58. It is understood that the direction of the flow of the net magnetic flux that is indicated by the arrow 234 and described above is for illustration purposes and the flux can flow in the opposite direction.

Thus, when the electromagnet 58 is energized, the magnetic forces can hold the hub plate 214 in frictional contact with the rotor body 70 such that the drive belt 206 can transmit torque to the drive member 30 and operate the compressor mechanism (not shown).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A clutch comprising:
   a hub that is rotatable about a central axis;
   a rotor that is rotatable about the central axis and is rotatable relative to the hub, the rotor defining an annular cavity disposed about the central axis, a surface of the annular cavity defining at least one groove that extends helically about the central axis; and
   an electromagnet received in the annular cavity;
   wherein:
   when the electromagnet is energized the hub is configured to engage the rotor to transmit torque between the hub and rotor;
   a front wall of the rotor defines a plurality of slots circumferentially spaced about the central axis, each slot fluidly coupling the annular cavity with an exterior side of the front wall;
   the front wall defines a plurality of first ramps circumferentially spaced about the central axis, each first ramp narrowing to a first edge, the first edge of each first ramp defining a trailing edge of a corresponding one of the slots; and the front wall defines a plurality of second ramps circumferentially spaced about the central axis, each second ramp narrowing to a second edge, the second edge of each second ramp defining a leading edge of a corresponding one of the slots.

2. The clutch of claim 1, wherein the surface defines an outer diameter of the annular cavity.

3. The clutch of claim 1, wherein the surface defines an inner diameter of the annular cavity.

4. The clutch of claim 1, wherein the groove is a right-handed helix.

5. The clutch of claim 1, wherein the groove is a left-handed helix.

6. A clutch comprising:
   a hub that is rotatable about a central axis;
   a rotor that is rotatable about the central axis and is rotatable relative to the hub, the rotor defining an annular cavity disposed about the central axis, a front wall of the rotor defines a plurality of slots circumferentially spaced about the central axis and a plurality of first ramps circumferentially spaced about the central axis, each slot fluidly coupling the annular cavity with an exterior side of the front wall, each first ramp narrowing to a first edge, the first edge of each first ramp defining a trailing edge of a corresponding one of the slots; and
   an electromagnet received in the annular cavity;
   wherein:
      when the electromagnet is energized the hub is configured to engage the rotor to transmit torque between the hub and rotor; and
      the front wall defines a plurality of second ramps circumferentially spaced about the central axis, each second ramp narrowing to a second edge, the second edge of each second ramp defining a leading edge of a corresponding one of the slots.

7. A clutch comprising:
   a hub that is rotatable about a central axis;
   a rotor that is rotatable about the central axis and is rotatable relative to the hub, the rotor including an inner wall, an outer wall, and a front wall, the inner, outer, and front walls defining an annular cavity disposed about the central axis, a surface of the annular cavity defining at least one groove that extends helically about the central axis, the front wall defining a plurality of slots circumferentially spaced about the central axis and a plurality of first ramps circumferentially spaced about the central axis, each slot fluidly coupling the annular cavity with an exterior side of the front wall, each first ramp narrowing to a leading edge, the leading edge of each first ramp defining a trailing edge of a corresponding one of the slots; and
   an electromagnet received in the annular cavity;
   wherein:
      when the electromagnet is energized the hub is configured to engage the rotor to transmit torque between the hub and rotor; and
      the front wall defines a plurality of second ramps circumferentially spaced about the central axis, each second ramp narrowing to a trailing edge, the trailing edge of each second ramp defining a leading edge of a corresponding one of the slots.

8. The clutch of claim 7, wherein the surface of the annular cavity is a surface of the outer wall.

9. The clutch of claim 7, wherein the surface of the annular cavity is a surface of the inner wall.

10. The clutch of claim 7, wherein when the electromagnet is switched between a de-energized state and an energized state, the hub is configured to move between a first axial position wherein an engagement surface of the hub is spaced apart from an engagement surface of the front wall, and a second axial position wherein the engagement surface of the hub frictionally engages the engagement surface of the front wall.

\* \* \* \* \*